(12) United States Patent
Groteke

(10) Patent No.: US 7,935,302 B1
(45) Date of Patent: May 3, 2011

(54) AUTOMATIC DROSS PROCESSING SYSTEM

(75) Inventor: Daniel E. Groteke, St. Joseph, MI (US)

(73) Assignee: Q. C. Designs, Inc., St. Joseph, MI (US)

( * ) Notice: Subject to any disclaimer, the term of this patent is extended or adjusted under 35 U.S.C. 154(b) by 0 days.

(21) Appl. No.: 12/566,944

(22) Filed: Sep. 25, 2009

Related U.S. Application Data

(60) Provisional application No. 61/101,196, filed on Sep. 30, 2008.

(51) Int. Cl.
*C21C 5/32* (2006.01)
(52) U.S. Cl. .......................................... 266/205; 266/227
(58) Field of Classification Search .................. 266/205, 266/227, 275
See application file for complete search history.

(56) References Cited

U.S. PATENT DOCUMENTS

| | | |
|---|---|---|
| 3,198,505 A | 8/1965 | Amdur et al. |
| 4,440,640 A * | 4/1984 | Groteke et al. ............... 210/237 |
| 6,464,929 B1 | 10/2002 | Groteke |
| 6,555,050 B1 | 4/2003 | Groteke et al. |
| 6,767,382 B2 | 7/2004 | Stratigos et al. |

* cited by examiner

*Primary Examiner* — Scott Kastler
(74) *Attorney, Agent, or Firm* — Michael J. Weins; Jeffrey E. Semprebon

(57) ABSTRACT

An automatic dross processing system has a pivotably-mounted reaction vessel and a vertically movable motor and impeller. A microprocessor controls the operation of the motor and a series of actuators that move the motor vertically, move a probe that removes a plug to drain collected metal from the reaction vessel, and move the reaction vessel between a loading-and-processing position and a dumping position. The microprocessor coordinates the actions of these elements to complete a dross processing cycle to recover metal from a dross without requiring the attention of an operator throughout the process. The reaction vessel can have an inner shell and an outer shell that are bolted together with a gap therebetween to accommodate insulation, which can include a felt overlying one or more pieces of rigid material. A drain tube can be attached to the inner shell by an accordion-like structure to reduce thermal stresses in service.

20 Claims, 13 Drawing Sheets

AUTOMATIC DROSS PROCESSING SYSTEM

FIELD OF THE INVENTION

The present invention relates to systems for processing a metal-bearing dross in a reaction vessel in order to separate and recover metal that is trapped in the dross.

BACKGROUND OF THE INVENTION

Systems for separating and recovering metal from a metal-bearing dross are taught in Applicant's U.S. Pat. Nos. 6,136,262; 6,464,929; and 6,555,050. In such dross processing systems, a metal-bearing dross is removed from the metal melt of a furnace and is placed into a reaction vessel of the dross processing system. An exothermic flux is added and the dross is then stirred to mix the exothermic flux into the dross and to cause molten metal droplets to coalesce in the dross. The molten metal is then allowed to drain from the dross, forming a pool in a bottom region of the reaction vessel with spent (demetalized) dross residing thereabove. After allowing the metal to pool for a sufficient time, a drain plug in the bottom region of the reaction vessel is removed to allow the molten metal to drain into a receptacle for recovery. After draining the molten metal, the reaction vessel is moved to a dump position where the spent dross is free to fall into a container for disposal. The reaction vessel is then returned to a loading/processing position to receive another batch of dross for processing.

While such systems have proven to be effective in recovering a significant portion of entrapped metal, several components of the system are susceptible to damage and/or accelerated wear due to operator error. The resulting systems are dependent on operator skill to ensure effective and safe performance and require an undesirable amount of time and attention on the part of the operator. Furthermore, delays that occur while the operator observes the process and decides when to take action can result in undesirable loss of temperature in the dross and metal, reducing the yield of recovered metal.

SUMMARY

The present invention relates to an automatic dross processing system into which is placed a hot dross having a significant amount of molten metal retained therein. The hot dross is then processed by the system to separate the dross into a liquid metal component and a dross component having a substantially reduced metal content (spent dross). The structural elements of the system are fabricated from a variety of components, some of which have been developed to extend the life of the components to make them more suitable for use in a fully automated system which is not subject to substantial down-time. Other components have been designed to provide cooperation between the elements so that they can be integrated into a fully automated system.

The system is provided with a frame. The frame in one embodiment is a two-part frame with a base section and a superstructure mounted thereto. The base section of the frame is sized so as to provide a space therein where a pig mold can be placed to serve as a receptacle for the liquid metal separated from the hot dross. A dross receptacle, into which the spent dross can be dumped, can be positioned beside the base section.

A cradle is provided, which has a reaction vessel mount pivotally attached thereto. When the frame has a base section, the cradle is supported thereon. In turn, a reaction vessel is attached to the reaction vessel mount which, in one embodiment, can be provided by employing a reaction vessel rim which bolts to the reaction vessel mount. The reaction vessel includes a drain port; examples of dual-shell reaction vessels which are suitable for use in the present system are described in U.S. Pat. Nos. 6,464,929 and 6,555,050.

One preferred reaction vessel for the present invention is a multiple shell vessel having an inner shell and an outer shell configured such that, when assembled together, leave a gap between the shells. The inner shell has an inner shell rim attached to an upper edge of an inner shell sidewall and projecting away from the inner shell sidewall. The outer shell has an outer shell mounting structure which attaches to an upper edge of an outer shell sidewall and is configured to attach to the inner shell rim so as to support the outer shell sidewall with respect to the inner shell rim providing a gap between the sidewalls. The inner shell sidewall terminates in a lower edge that joins an inner shell bottom plate having a central passage therethrough, to which is attached a drain tube that projects away from the inner shell. In one embodiment, the drain tube is attached to the inner shell bottom plate via an accordion-like structure to reduce thermal stresses during use in service. To facilitate assembly of the reaction vessel, the outer shell has a detachable outer shell bottom plate which attaches to the outer shell sidewall and has a central opening through which the drain tube passes; the shells are configured such that the attachment of the outer shell bottom plate to the outer shell sidewall results in a gap between the bottom plates.

The gap between shells is preferably filled with insulating material; when a rigid insulating material is positioned between the bottom plates, it can serve to transfer the weight of dross contained in the inner shell to the outer shell to allow the outer shell to provide support for such weight, allowing the inner shell to be fabricated with less massive structure to reduce chilling of the dross. In some embodiments, a felt of insulating material is interposed between the inner shell bottom plate and the rigid insulating material so as to provide better distribution of the load on the bottom of the inner shell providing additional load bearing capacity for the inner shell to better support the dross and collected metal.

Means for pivoting the reaction vessel between a substantially horizontal position and a dump position are provided. The reaction vessel is maintained in the substantially horizontal position, where the rim of the reaction vessel resides in a horizontal plane, for loading and treating the dross, and after treatment is moved to the dump position where the spent dross can fall from the reaction vessel.

The frame has a substantially vertical element which rises above the cradle. A motor is provided, having a motor drive axis to which is attached an impeller. A motor mount is connected to the substantially vertical element and configured so as to provide a path for movement of the motor such that the impeller can be lowered into the reaction vessel and withdrawn therefrom. A means for translating the impeller is provided to lower the impeller into the reaction vessel and to raise the impeller to a height such that the reaction vessel mount and the reaction vessel can be pivoted relative to the cradle between the substantially horizontal position and the dump position. In one preferred embodiment, the means for translating the impeller is a linear actuator that drives the motor mount along a track that is attached to the substantially vertical element.

A splash shield is provided which shrouds the impeller when the impeller is in contact with the dross contained in the reaction vessel. This can be provided by having at least a portion of the splash shield slidably engage the motor mount and let gravity bring the splash shield in contact with the reaction vessel or the reaction vessel mount. Alternatively, the splash shield could be affixed to the motor mount and means provided for advancing the motor with respect to the motor mount to allow the height of the impeller with respect to the splash shield to be adjusted.

To effectively provide an automated system, the reaction vessel is provided with a drain tube which is configured to accept a plug providing a seal therebetween and where the plug can be removed on demand. This plug must be effective in sealing the drain tube, but capable of being readily removed. Such a plug can be provided by a plug with a stepped cross section, having a lower section which slidably engages a passage of the drain tube and a larger cross section that will rest atop the drain tube. For smaller systems, a simple wad of appropriate material such as refractory wool can be employed.

In some cases, to effectively operate the system and promote the coalescence and separation of the retained metal through the dross, it may be necessary to make supplemental additions of flux to increase the temperature of the dross so as to facilitate draining of the retained metal from the dross. The system could be designed to either notify the operator to add flux to the reaction vessel at an appropriate time in the cycle, or could incorporate a device to add flux automatically; however, such would significantly complicate the system.

A probe is provided, which can be advanced into the drain tube so as to dislodge the plug. One such probe can be provided by an L-shaped element having one arm pivotally mounted with respect to the cradle such that the other arm is advanced into the drain tube as the probe is rotated by a means to pivot the probe.

To automate the dross processing system, a microprocessor is provided to control and coordinate the actions of the various components of the system in such a manner as to optimize the separation of the metal entrapped in the dross. The microprocessor is programmed via a user interface and by instruction sets that can loaded to the microprocessor. The microprocessor has an interface to receive input from various components of the system and, based on this input and the instruction sets, the microprocessor directs the system through the processing of the dross.

Limit switches can be provided as part of the automated system to limit the vertical motion of the impeller, such limit switches being tied into the control system either directly or through the microprocessor. An upper limit must be set so as to assure that, when an upper limit is reached, the reaction vessel and the reaction vessel mount can be swung past the impeller without interference and, when the lower limit is reached, the impeller resides in the reaction vessel and in close proximity to but spaced apart from a bottom region of the reaction vessel (i.e., the inner shell bottom plate for a dual-shell reaction vessel).

BRIEF DESCRIPTION OF THE FIGURES

In FIG. 3, the motor and the impeller are in their upper position to provide clearance for a reaction vessel mount to swing the reaction vessel to a dump position, as illustrated, where remaining dross is free to spill out of the reaction vessel.

FIG. 5 also shows a probe which is employed by the system to remove the plug from the drain tube to allow metal collected in the reaction vessel to drain therefrom. FIG. 5 shows the probe as it is being pivoted to move a probe tip into the drain tube of the reaction vessel. FIG. 5 also shows a probe limit switch that is open for the position of the probe shown in FIG. 5.

FIG. 10 also illustrates an alternative probe that offers ease in replacing a probe tip when it becomes worn or damaged and provides for greater structural stability of the probe, as well as an alternative position for the probe limit switch.

FIG. 14 also schematically illustrates elements of the system that allow it to perform the processing cycle represented by the flow chart shown in FIG. 12.

DETAILED DESCRIPTION OF THE PREFERRED EMBODIMENTS

Figure 1:
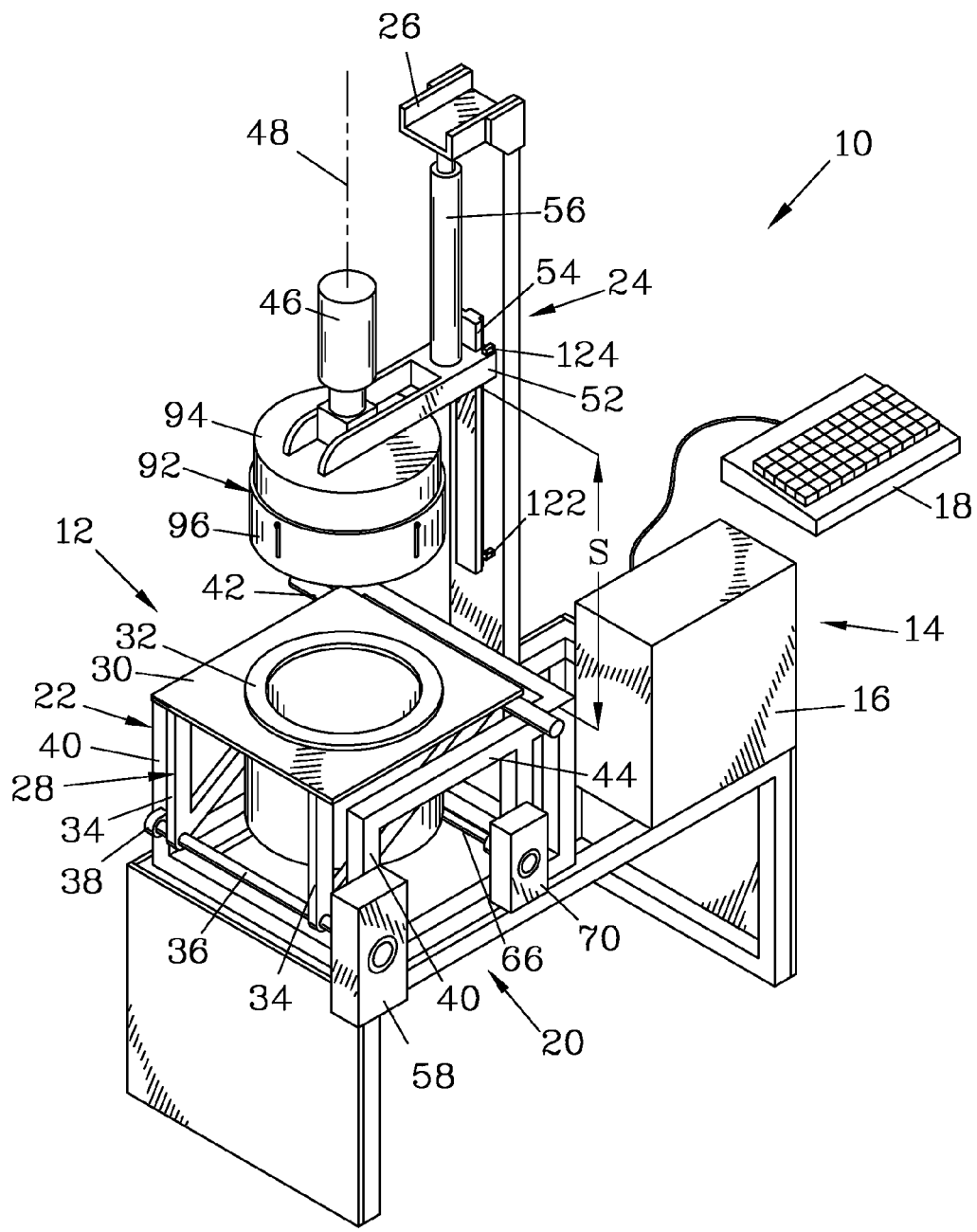
FIG. 1 is an isometric view showing an automatic dross processing system that forms one embodiment of the present invention. The dross processing system is shown in a position ready to be loaded with dross, with a reaction vessel positioned with its rim substantially horizontal and a motor and an impeller (shown in FIG. 2) placed in an upper position, allowing access to the reaction vessel.

FIG. 1 is an isometric view of an automatic dross processing system 10 that forms one embodiment of the present invention. The automatic dross processing system 10 can be divided into two subsystems: a dross handling system 12 and a control system 14 which coordinates the sequence of the operations performed by the dross handling system 12. The subsystems (12, 14) can communicate with each other either by hard wiring or by wireless communication technology such as Bluetooth technology.

The control system 14 employs a programable microprocessor 16 and has a user input interface 18 to allow an instruction set to be adjusted so as to optimize the operational parameters of the dross handling system 12. Alternatively, the parameters could be adjusted by reprogramming a memory of the microprocessor 16 by replacing a memory storage element or through a digital interface. The control system 14 can be designed to allow an operator to manually activate many of the actions of the system 10, either independently or by overriding the instructions provided to the microprocessor 16.

The dross handling system 12 has a frame 20, which in turn has a cradle section 22 and a substantially vertical section 24 that is attached to the cradle section 22 and extends thereabove. The substantially vertical section 24 terminates in a cap 26 which extends over the cradle section 22.

Figure 2:
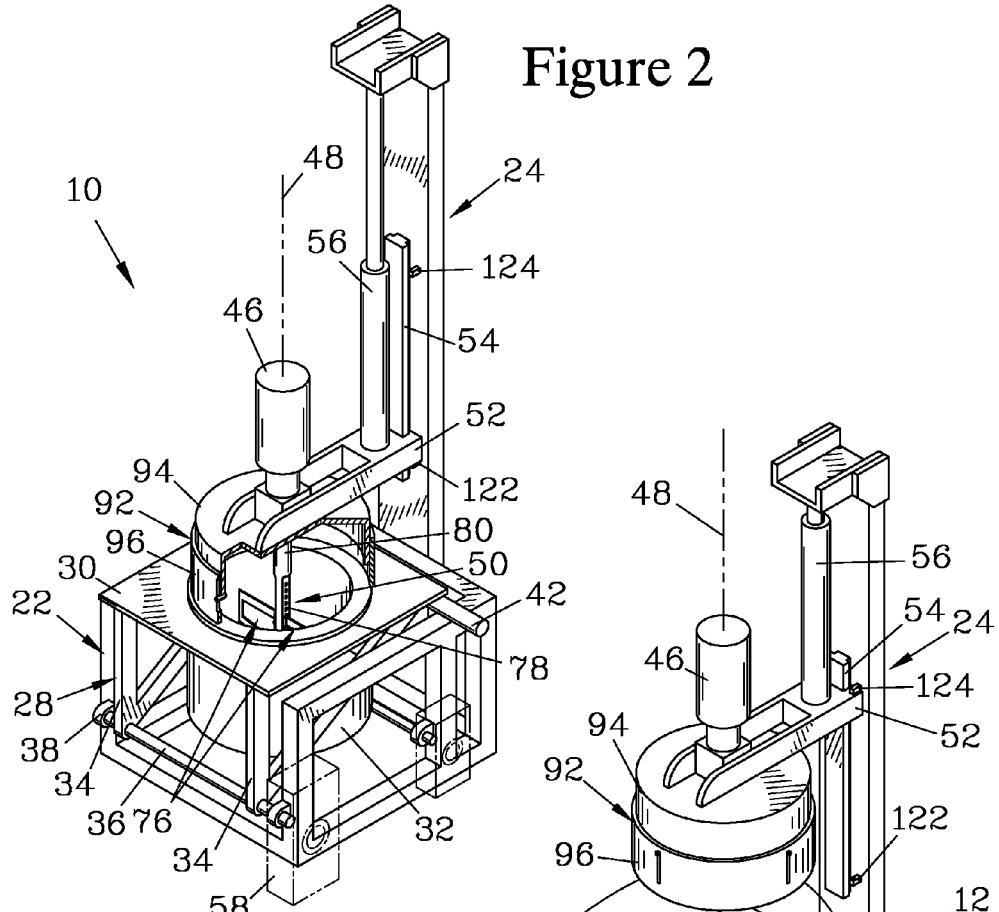
FIG. 2 is a partial isometric view of the dross processing system shown in FIG. 1 during the processing of the dross, where the reaction vessel is in its substantially horizontal position but where the motor is in a lower position where the impeller is positioned within the reaction vessel to stir the dross contained therein. In this position, a splash shield encloses the rim of the reaction vessel.

A reaction vessel mount 28 is provided, having a rim plate 30 to which a reaction vessel 32 is attached; typically the reaction vessel 32 has a rim that is affixed to the rim plate 30 by fasteners, such as discussed below with regard to FIG. 11. The rim plate 30 is supported in the cradle section 22 by a pair of substantially vertical legs 34 which attach to a dump pivot shaft 36 which in turn pivotally engages dump shaft bearings 38 attached to front side members 40 of the cradle section 22. This pivotal engagement allows the reaction vessel mount 28 to be pivoted to swing the reaction vessel 32 between a processing position, as shown in FIGS. 1 and 2, and a dump position, shown in FIG. 3. The rim plate 30 is provided with additional support when the reaction vessel 32 is in the processing position by an indexing bar 42 which rests on top side members 44 of the cradle section 22. When the indexing bar 42 is sufficiently long as to extend beyond the cradle section 22, it can also serve as a handle to allow the operator to manually move the reaction vessel 32 to its dump position in the event that the system 10 loses power.

Figure 4:
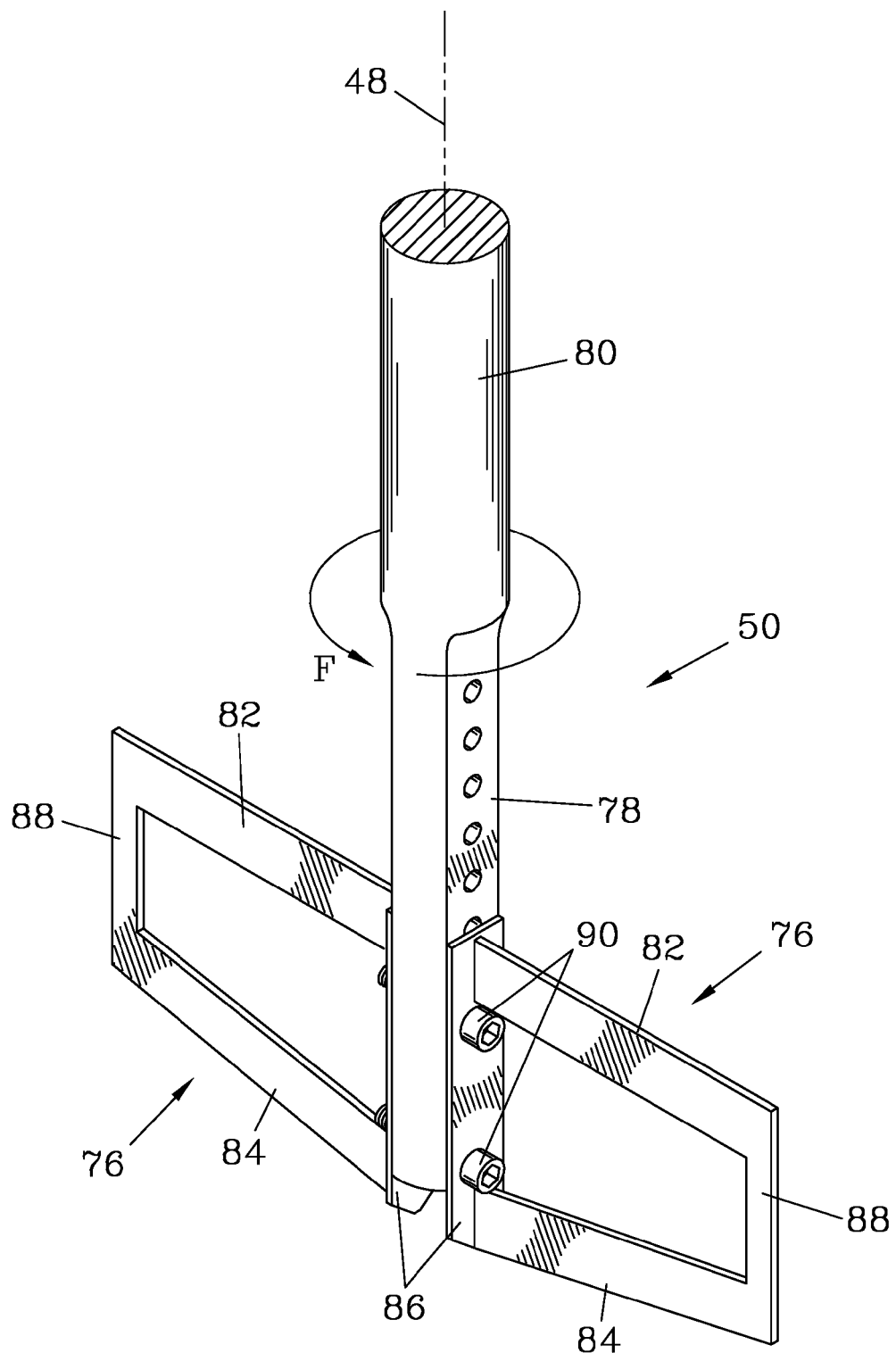
FIG. 4 is an isometric view of the impeller suitable for the embodiment shown in FIGS. 1-3, illustrating further details of two paddles employed in the impeller.

The dross handling system 12 is provided with a motor 46 having a motor axis 48, the motor serving to drive an impeller 50 shown in FIGS. 2 and 4. The motor 46 is typically a fixed-speed electric gear motor or a hydraulic motor; however, a variable-speed motor can be used and, in such cases, the speed can be controlled by the programable microprocessor 16 to provide greater flexibility in the motion provided to the impeller 50. The impeller 50 is axially aligned with the motor axis 48 and rotates thereabout when driven by the motor 46 under the control of the control system 14.

The motor 46 is in turn mounted to a motor mount 52, which in turn slidably engages a vertical track 54 that is affixed to the substantially vertical section 24. The motor mount 52 is raised and lowered on the track 54 by a motor height actuator 56 which in this embodiment is a linear actuator attached between the motor mount 52 and the cap 26. It should be appreciated that alternative actuators could be employed, such as a motor operating a pinion gear that engages a rack. The motor height actuator 56 is in turn controlled by the control system 14, which in this embodiment controls the extension of the motor height actuator 56. The motor height actuator 56 allows the impeller 50 to be positioned into the reaction vessel 32, as shown in FIG. 2, and removed therefrom. It also allows the impeller 50 to be raised to a sufficient height that the reaction vessel 32 can be swung to its dump position illustrated in FIG. 3. A dumping actuator 58 (shown in FIG. 1) serves to move the reaction vessel 32 between its processing position illustrated in FIGS. 1 and 2 and its dump position illustrated in FIG. 3; in this embodiment, the dumping actuator 58 is a rotary actuator.

Figure 3:
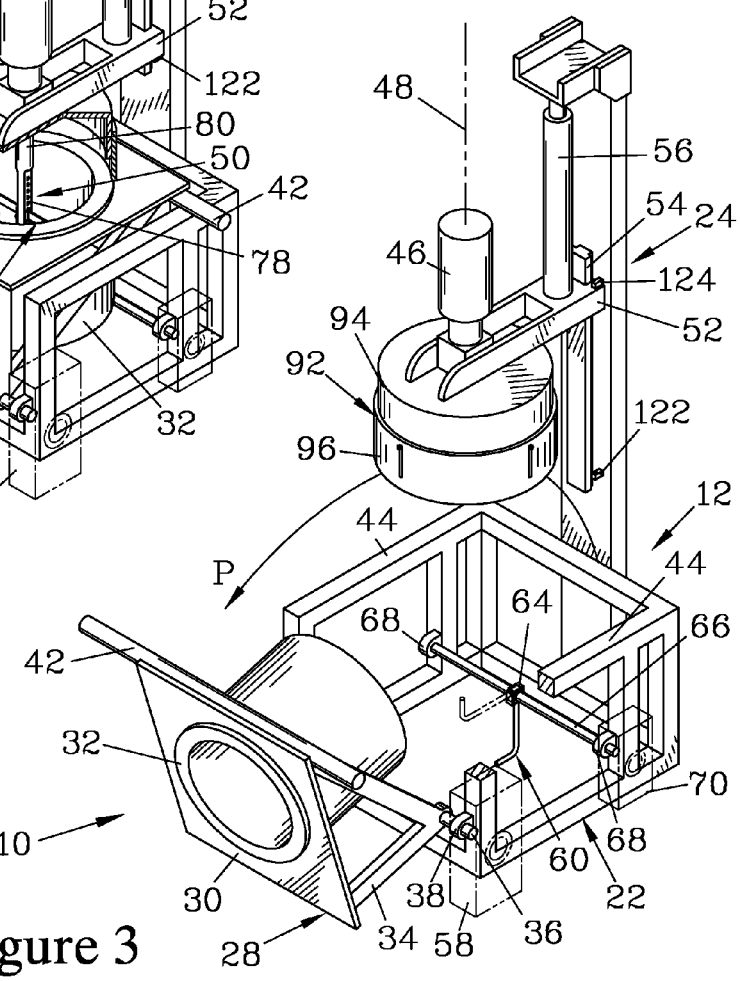
FIG. 3 is another partial isometric view of the dross processing system shown in FIG. 1, after the dross in the reaction vessel has been processed to drain entrapped metal therefrom.
Figure 5:
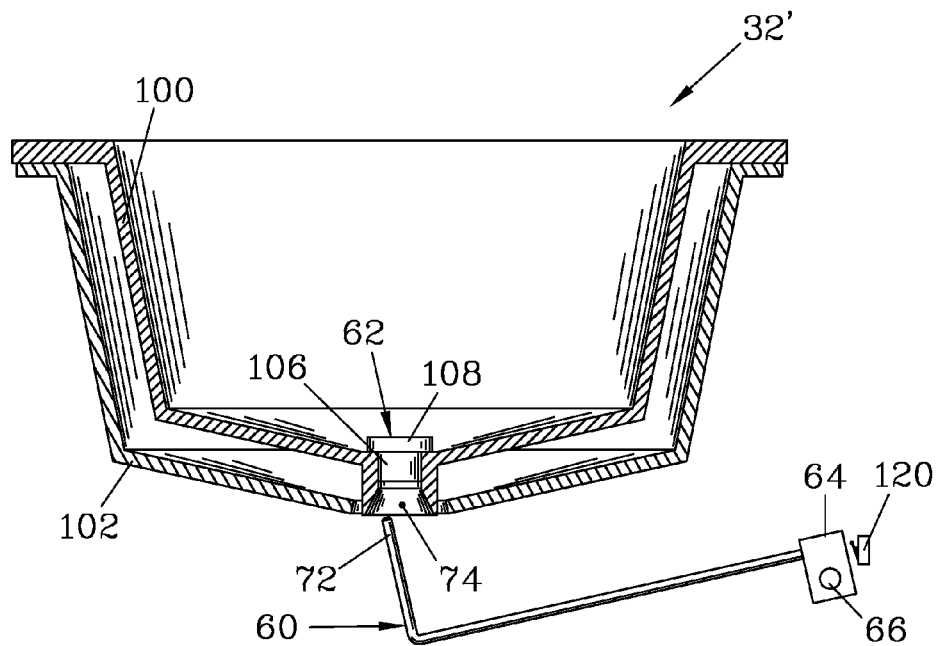
FIG. 5 is a section view of a reaction vessel suitable for use in the system shown in FIGS. 1-3, showing details of its dual-shell structure and a drain tube which can be sealed by a plug.
Figure 6:
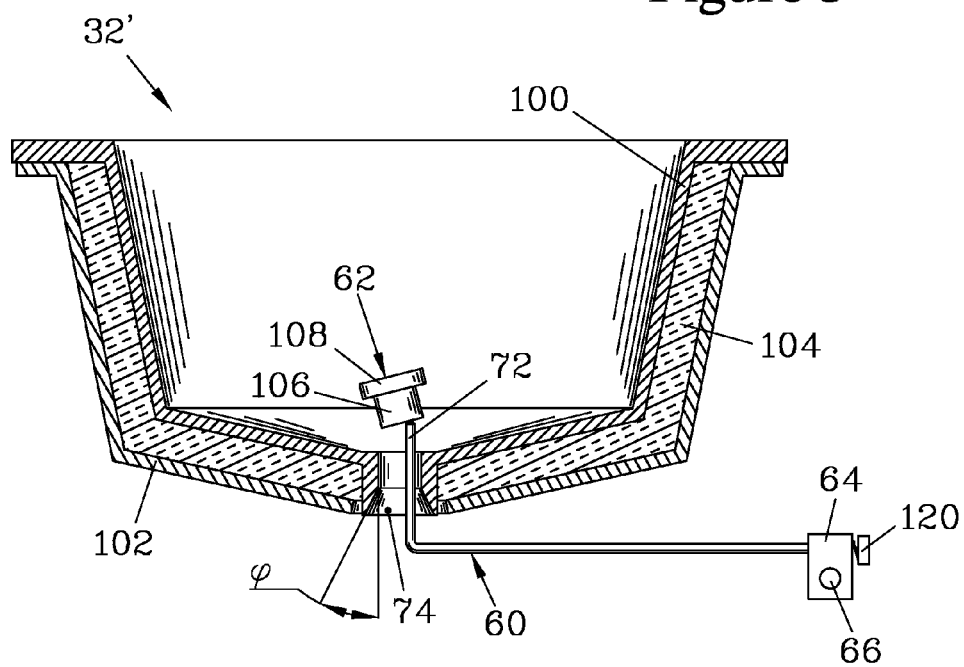
FIG. 6 is a section view showing the reaction vessel and the probe shown in FIG. 5 when the probe has been fully pivoted to a position where it has pushed the plug from the drain tube. In this position, the probe limit switch is closed and provides a signal to the microprocessor to indicate that the probe has reached a position where it has removed the plug from the drain tube. The reaction vessel of FIG. 6 also shows the region between the shells filled with an insulating material to reduce chilling of the hot dross.
Figure 13:
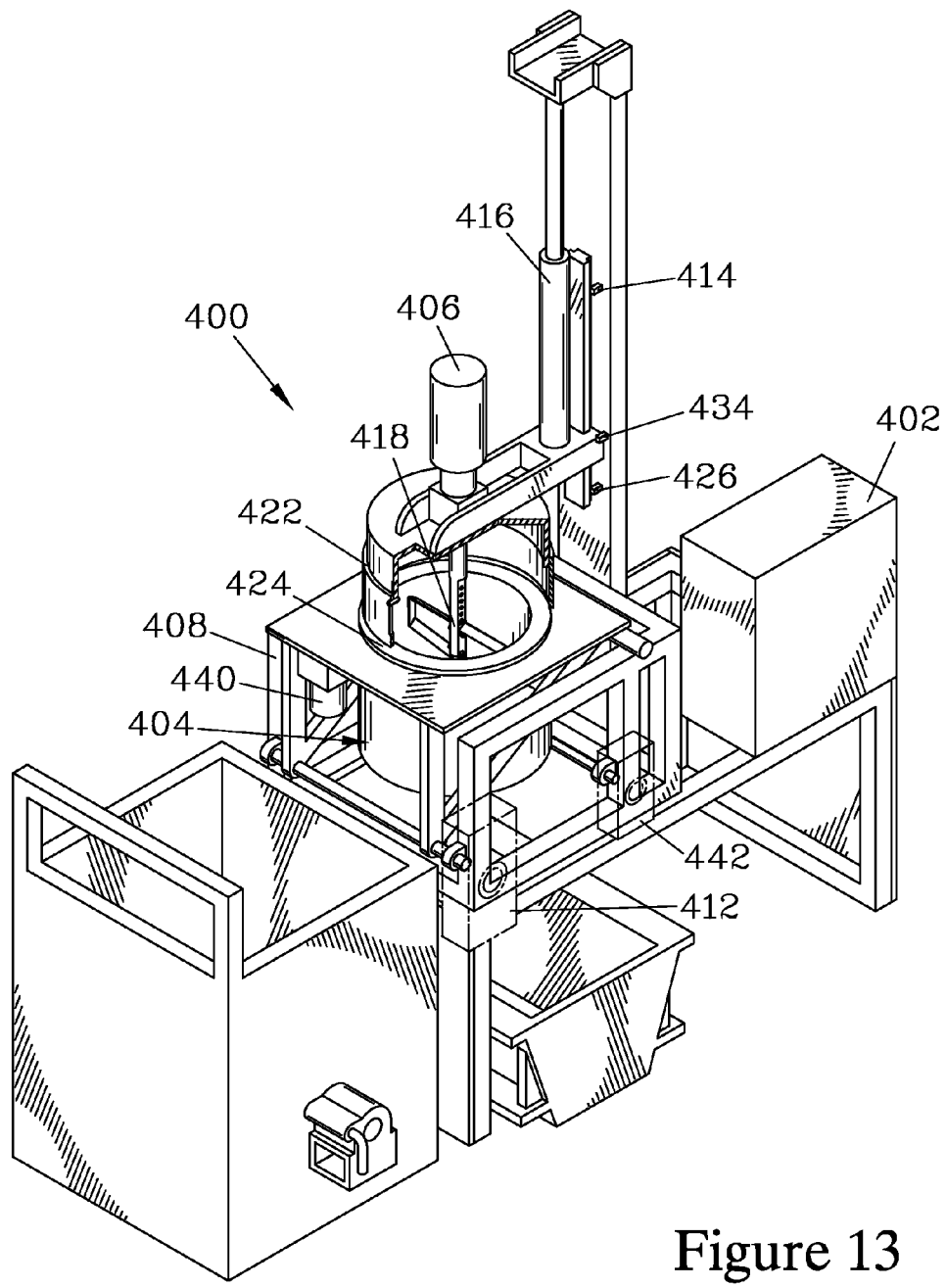
FIG. 13 is an isometric view of an automated dross processing system similar to that shown in FIGS. 1-3, but incorporating an optional intermediate position switch that serves to stop raising of the motor at an intermediate position, as illustrated in FIG. 13, where a portion of the impeller still resides within the reaction vessel in contact with the dross. The motor can stir the dross for a time while positioned at this intermediate level before being raised to its upper position.

FIG. 3 illustrates a probe 60 that is provided for the ejection of a plug 62, illustrated in FIGS. 5 and 6 which also show further details of the structure of a reaction vessel 32' which could be employed in place of the reaction vessel 32. The plug 62 serves to block the flow of the liquid metal that accumulates in the bottom of the reaction vessel 32'. The probe 60 is mounted in a probe block 64 which in turn is attached to a probe shaft 66 which is rotatably mounted in probe shaft bearings 68 (shown in FIG. 3). A probe actuator 70 drives the shaft 66 and rotates a probe tip 72 of the probe 60 against the plug 62, dislodging it from a drain tube 74 of the reaction vessel 32' and allowing molten metal collected in the reaction vessel 32' to drain into a conventional pig mold located therebelow; one such mold which could be employed is shown in FIG. 13. In the embodiment illustrated, a rotary actuator serves as the probe actuator 70. To facilitate entry of the probe tip 72, the drain tube 74 can be chamfered at an angle ω of about 30°. After the metal is drained, the spent dross remaining in the reaction vessel 32' can be dumped by moving the reaction vessel 32' into the dump position, as illustrated in FIG. 3 for the reaction vessel 32.

It should be noted that, in the system 10 illustrated, the dump pivot shaft 36 is vertically spaced apart from the rim plate 30 so as to reside therebelow when the reaction vessel 32 is in its horizontal loading and processing position. This vertical displacement causes the reaction vessel mount 28 to move the reaction vessel 32 somewhat away from the cradle section 22 as the reaction vessel pivots to its dump position, thus causing the spent dross to be dumped at a slight distance from the cradle section 22 to facilitate catching the spent dross in an appropriate receptacle placed beside the frame 20.

FIGS. 2 and 4 illustrate the details of the impeller 50, which has two paddles 76 which attach to an extension 78 of a motor shaft 80. Each of the paddles 76 has an upper blade 82 and a lower blade 84 that is sloped upward as it extends away from the extension 78 of the motor shaft 80 so as to be parallel to a bottom surface of the reaction vessel 32. When the motor 46 and the impeller 50 are in their lower position, the lower blades 84 are in close proximity to but spaced apart from the bottom of the reaction vessel 32.

Figure 7:
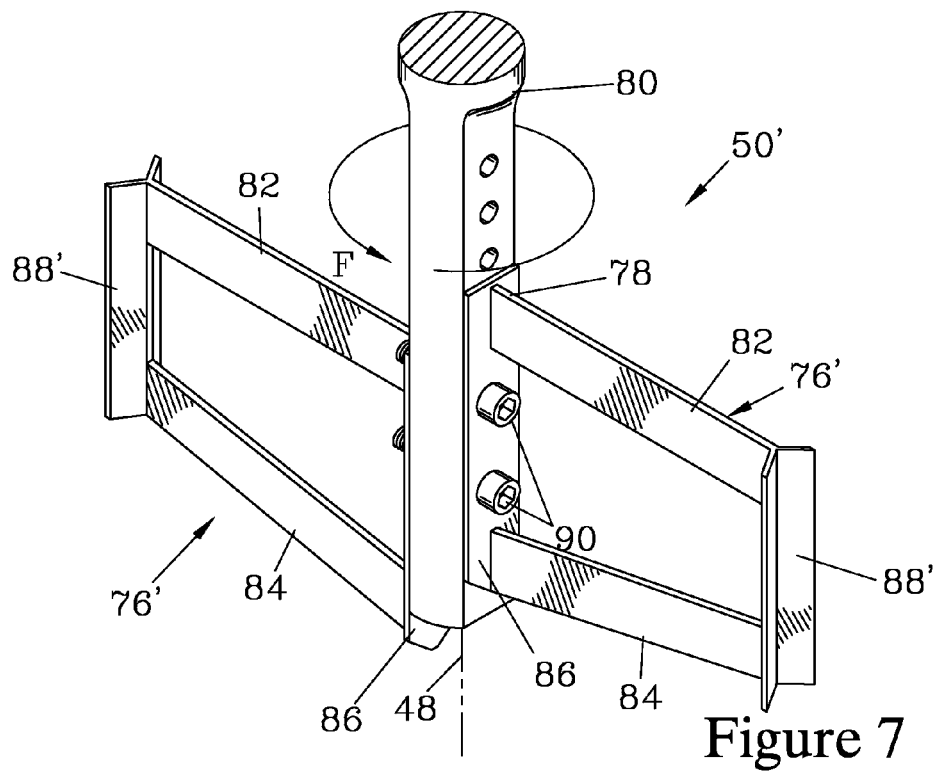
FIG. 7 is an isometric view illustrating an alternative impeller that can be used as an alternative to the impeller shown in FIG. 4. This impeller has blades that are connected by an outer support member that has sloped surfaces that tend to move dross toward an axis of rotation of the impeller when the impeller is rotated in either direction.

The blades (82, 84) are attached together by an inner mounting 86 and an outer support plate 88. The inner mounting 86 has mounting holes (not shown) to allow the paddle 76 to be mounted to the extension 78 by fasteners such as bolts 90. Mounting the paddles 76 to the extension 78 by fasteners allows the paddles 76 to be readily replaced if worn or damaged, and allows adjusting the dynamic action of the impeller 50 by allowing the paddles 76 to be positioned at a vertical offset with one higher than the other, as shown in FIG. 7 for an alternate impeller 50', or for the paddles 76 to be replaced with other paddles having a different configuration to alter the mixing action to be provided. While such removable mounting of the paddles 76 to the extension 78 offers several advantages, a similar impeller could be fabricated by permanently affixing paddles to a shaft extension, such as by welding, to reduce the cost of fabrication and possibly reduce the thermal mass of the resulting impeller to reduce chilling of the reacting dross.

The alternative impeller 50' illustrated in FIG. 7 is felt to provide improved mixing action. For the impeller 50', each of the paddles 76' is provided with an outer support member 88' that has angled surfaces which form a convex surface as viewed from the motor axis 48, and thus tend to move the dross towards the motor axis 48 when the impeller 50' is rotated in either direction. This feature reduces the wear on the sidewall of the inner shell of the reaction vessel.

Referring again to FIG. 2, the impeller 50 is shown in the environment in which it operates. The motor mount 52 has a splash shield 92 attached thereto, which is shown partly cut away in FIG. 2. In this embodiment, a shield upper portion 94 of the splash shield 92 is affixed to the motor mount 52, and has a shield lower portion 96 that slidably engages the shield upper portion 94, allowing the impeller 50 to reside below the splash shield 92 when the shield lower portion 96 rests on the rim plate 30 and the impeller 50 is lowered into the hot dross contained in the reaction vessel 32. The splash shield 92 encloses the reaction vessel 24 to prevent material being thrown therefrom by the action of the impeller 50.

As noted above, FIGS. 5 and 6 illustrate further details of the reaction vessel 32', which is one example of a dual-shell reaction vessel that can be used with the current system. The reaction vessel 32' has an inner shell 100 and an outer shell 102 that are tack-welded together with an insulating material 104 (shown in FIG. 6) positioned between the shells (100, 102); tack-welding the shells (100, 102) together allows them to be broken apart for maintenance, such as to replace the inner shell 100 and/or the insulating material 104. Further discussion of such dual-shell reaction vessels is found in U.S. Pat. Nos. 6,464,929 and 6,555,050. To reduce stresses due to thermal cycling, the drain tube 74 is only welded to the inner shell 100. However, independent of the details of the reaction vessel, all reaction vessels need to be provided with a drain tube and plug combination where the drain tube can be readily opened by pushing up from below with a probe. For the reaction vessel 32' illustrated, the plug 62 has a plug body 106 having a uniform cross section with a expanded cap 108 that will engage the bottom of the reaction vessel 32'. Other configurations of plugs could be employed, so long as they are designed to remain in place against the head of molten metal and dross which is being stirred in the reaction vessel 32; for small reaction vessels, a wad of suitable material such as refractory wool could be employed. However, while the plug 62 must remain in place while the metal is being collected, the plug 62 must be readily removable from the drain tube 74 by pushing from below.

Figure 8:
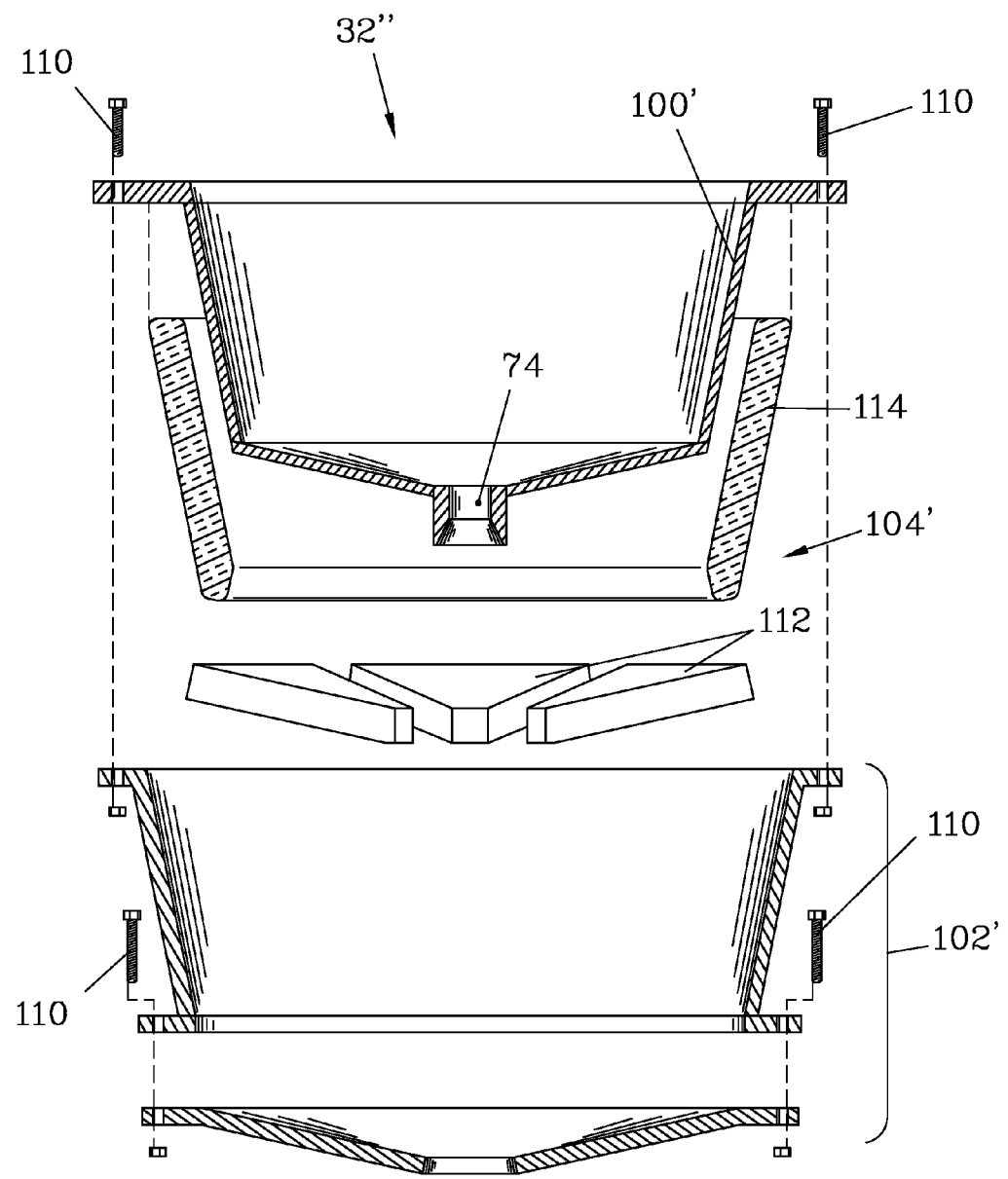
FIG. 8 is an exploded section view showing an alternative reaction vessel to that shown in FIGS. 5 and 6. This reaction vessel has a modular construction that allows ready replacement of damaged or worn components, and includes rigid insulation panels that provide additional structural support for the bottom region of the inner shell by transferring weight to the outer shell; this allows the inner shell to be thinner, reducing its chilling effect on the reacting dross and allowing it to be more compliant to thermal strains.

FIG. 8 illustrates an alternative reaction vessel 32", which differs from the reaction vessel 32' in that it has an inner shell 100' and an outer shell 102' that are removably coupled together by bolts 110. FIG. 8 shows the components of the reaction vessel 32" when disassembled. This removable coupling provides a vessel where the inner shell 100' that is exposed to severe environmental conditions and/or the insulating material 104' that is positioned between the shells (100', 102') can be readily replaced if necessary. The insulating materials 104' employed in this embodiment provide resistance to distortion of the inner shell 100' when the reaction vessel 32" is intended for use in situations where large amounts of dross are processed. In such cases, it is desirable to provide additional support to the inner shell 100' to accommodate the weight of the dross, without increasing the thickness of the inner shell 100'. Maintaining the inner shell 100' relatively thin reduces any tendency for it to act as a heat sink, prematurely cooling the reacting dross. The insulating materials 104' include an array of relatively rigid bottom insulation panels 112, which distribute the load on the inner shell 100' across the outer shell 102' to provide additional support for the inner shell 100'. The remaining space between the shells (100', 102') can be filled with a softer side insulating material 114. Attaching the shells (100', 102') together using the bolts 110 allows adjusting the spacing between the shells (100', 102') to accommodate any shrinkage of the insulating materials 104' over time.

Figure 9:
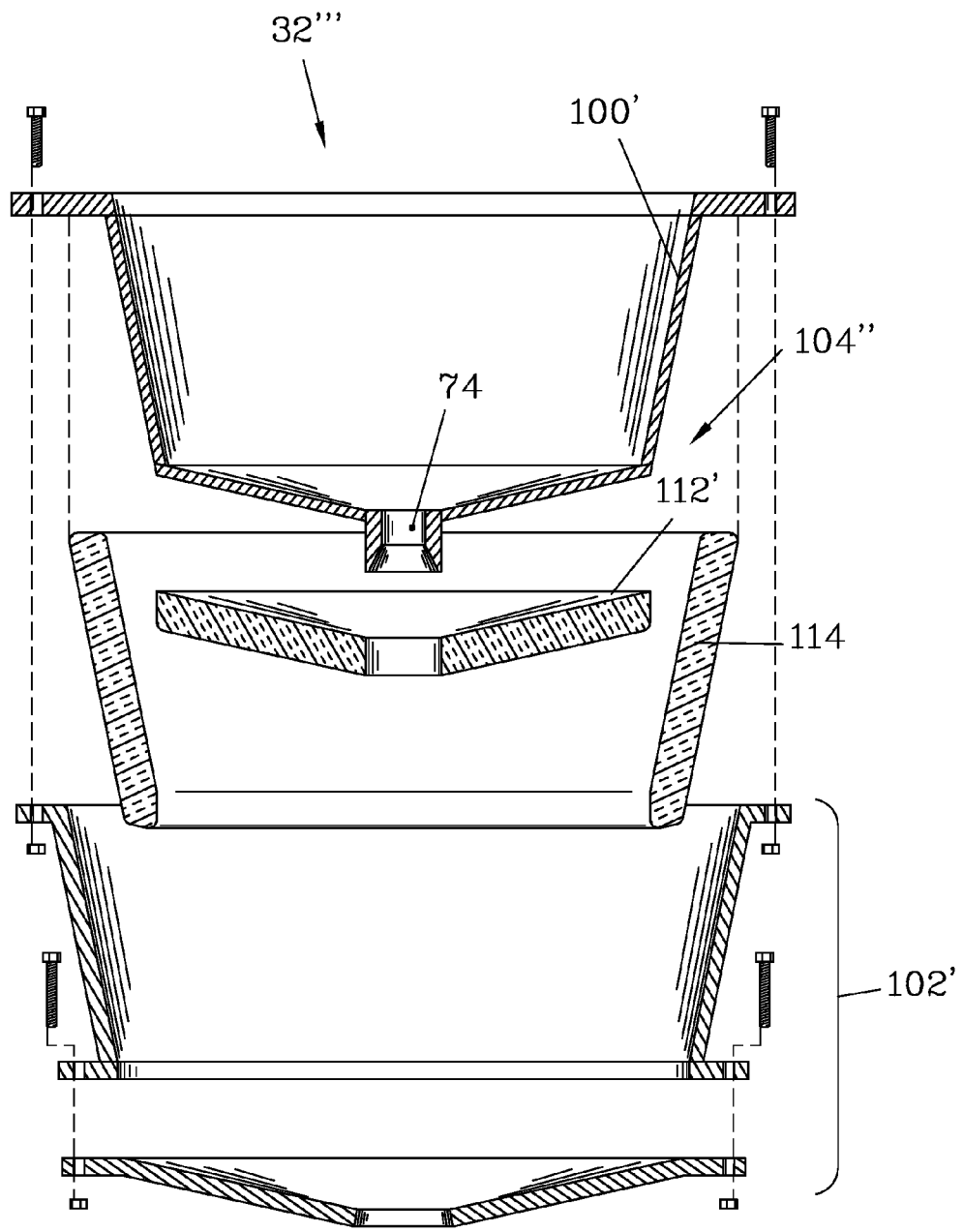
FIG. 9 is an exploded view of an alternate reaction vessel which has many features in common with the reaction vessel shown in FIG. 8, but where support for the bottom region of the inner shell is provided by a rigid insulating cast form to provide the resulting vessel with increased rigidity and better distribution of weight from the inner shell to the outer shell.

FIG. 9 illustrates an alternative embodiment of a reaction vessel 32'" which has a structure similar to that of the reaction vessel 32" discussed above. However, in the reaction vessel 32'", the insulating materials 104" include a single-piece rigid bottom insulating material 112' which resides below a bottom region of the inner shell 100'. Employing the single-piece rigid bottom insulating material 112' provides more uniform support to the bottom of the inner shell 100' and enhanced rigidity for the inner shell 100'.

Figure 10:
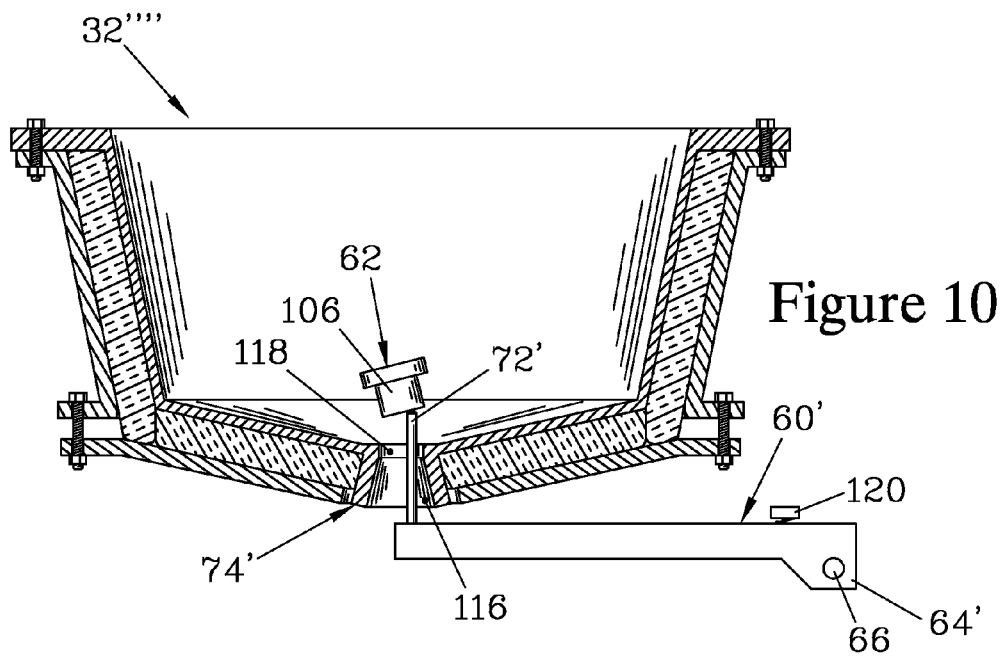
FIG. 10 is an assembled section view of another alternative reaction vessel, which is similar to that shown in FIG. 9 but which employs a different drain tube configuration; in this reaction vessel, the drain tube has a frustoconical section to aid in moving a probe into the drain tube to remove the plug therefrom.

FIG. 10 illustrates another alternative reaction vessel 32"", which is similar to the reaction vessel 32'" shown in FIG. 9 but which employs a different drain tube 74'. The drain tube 74' has a frustoconical section 116 to facilitate entry of the probe tip 72. In the drain tube 74' illustrated, a cylindrical section 118 is provided that is configured to be snugly engaged by the plug body 106.

FIG. 10 also shows an alternative probe 60', which provides for greater rigidity of the probe while still facilitating replacement of the probe tip 72' when worn or damaged. In the probe 60', the probe block 64' is extended to form a substantial portion of the probe 60', into which the probe tip 72' is removably mounted. When worn or damaged, only the short probe tip 72' need be replaced.

FIG. 10 also illustrates two alternative positions for a probe limit switch 120 that can be employed to provide a signal to the microprocessor 16 when the probe 60' is positioned to remove the plug 62 from the drain tube 74'. FIGS. 5 and 6 illustrate one example of how the probe limit switch 120 can be closed as the probe 60 moves to a fully extended position where it removes the plug 60 from the drain tube 70.

Figure 11:
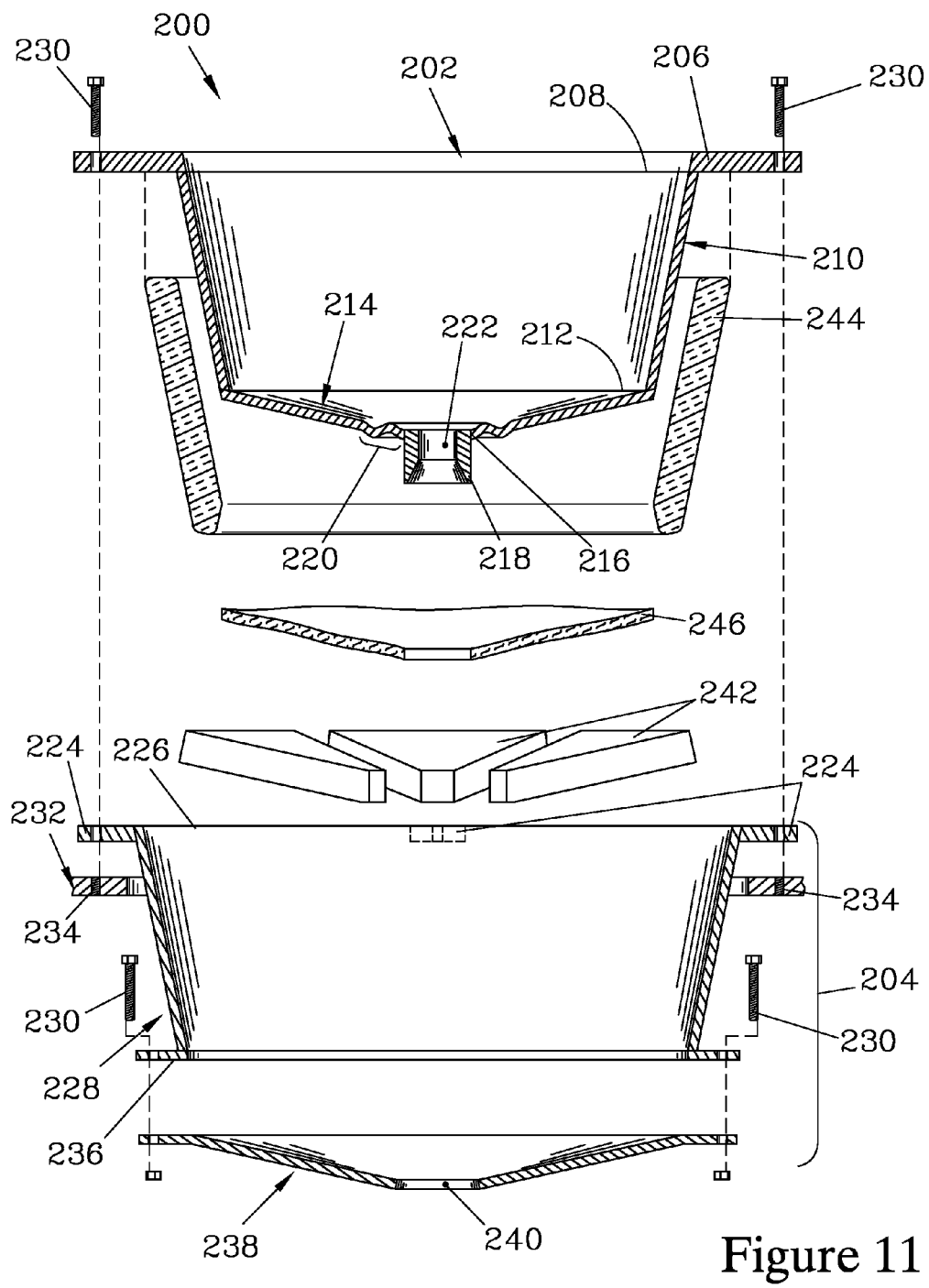
FIG. 11 is an exploded view of another alternate reaction vessel that is similar to the reaction vessel shown in FIG. 8; however, the drain tube is attached to an inner shell bottom plate via an accordion structure to accommodate stress and strains introduced by thermal cycling. Additionally, the reaction vessel is provided with a felt of insulating material to help smoothly distribute the load between the inner shell bottom plate and the refractory panels that in turn rest on an outer shell bottom plate.

FIG. 11 illustrates an alternative reaction vessel 200 that shares many features in common with the reaction vessel 32" shown in FIG. 8. The reaction vessel 200 has an inner shell 202 and an outer shell 204 that, when assembled together, have a space therebetween. The inner shell 202 has an inner shell rim 206 that attaches to an inner sidewall upper edge 208 of an inner shell sidewall 210. The inner shell rim 206 projects away from the inner shell sidewall 210 and serves as a rim for the reaction vessel 200. The inner shell sidewall 210 terminates in an inner sidewall lower edge 212 that joins an inner shell bottom plate 214 that in turn has an inner bottom central passage 216 therethrough.

A drain tube 218 is attached to the inner bottom central passage 216 and, in the reaction vessel 200, the attachment is via a rippled accordion structure 220 that provides a degree of flexibility in the attachment to accommodate thermal stresses on the inner shell bottom plate 214 and the drain tube 218. The drain tube 218 extends downwardly away from the inner shell bottom plate 214 and has a drain passage 222 through which collected recovered metal can flow.

The outer shell 204 in this embodiment has a series of outer shell mounting tabs 224 that attach to an outer sidewall upper edge 226 of an outer shell sidewall 228; a continuous rim could be employed for the outer shell, as is employed in the reaction vessels (32', 32", 32''', and 32'''') discussed above, but would result in a greater weight for the reaction vessel. Similarly, the inner shell could be provided with tabs in place of a continuous rim as illustrated. The outer shell mounting tabs 224 project away from the outer shell sidewall 228 and provide a mounting structure that is configured to abut against and attach to the inner shell rim 206. When the outer shell mounting tabs 224 and the inner shell rim 206 are attached together, the outer shell sidewall 228 is spaced apart with respect to the inner shell sidewall 210, providing a gap therebetween. The inner shell rim 206 and the outer shell mounting tabs 224 can be attached together by fasteners such as bolts 230. In the embodiment illustrated, the bolts 230 can also serve to attach the rims (206, 224) to a rim plate 232 of a reaction vessel mount, the rim plate 232 having threaded passages 234 into which the bolts 230 can be threadably secured. Alternatively, the shells (202, 204) could be bolted together and secured with nuts independently of the attachment of the reaction vessel 200 to the rim plate 232.

The outer shell sidewall 228 has an outer shell lower edge 236 to which an outer shell bottom plate 238 can be removably attached. Again, the attachment can be provided by bolts 230. The outer shell bottom plate 238 has an outer bottom central opening 240 through which the drain tube 218 passes when the shells (202, 204) are assembled together with the outer shell bottom plate 238 attached to the outer sidewall lower edge 236. The shells (206, 224) are configured such that, when assembled, the bottom plates (214, 238) are spaced apart. As with the reaction vessel 32" shown in FIG. 8, a number of rigid insulating panels 242 are placed between the bottom plates (214, 238), while a soft insulating material 244 is positioned between the sidewalls (210, 228). To better transfer weight from the inner shell bottom plate 214 to the insulating panels 242, a layer of a refractory felt material 246 can be placed between the inner shell bottom plate 214 and the insulating panels 242 to distribute the weight of the inner shell bottom plate 214 onto the panels 242. It should be noted that the use of the bolts 230 to attach the outer shell bottom plate 238 to the outer sidewall lower edge 236 allows the outer shell bottom plate 238 to be advanced towards the inner shell bottom plate 214 by tightening the bolts 230, in order to compensate for any shrinkage of the insulating materials (242, 246) over time.

Again looking to the control system 14 of the system 10 shown in FIGS. 1-3, there are other ancillary components beyond the microprocessor 16 and related "software" and user input interface 18 the are needed, such as limit switches. Referring again to FIG. 2, the system 10 is shown with the motor mount 52 at its lowered position where it engages a lower limit switch 122 (better shown in FIGS. 1 and 3) that form part of the control system 14 can serve directly to stop movement of the motor mount 52. The lower limit switch 122 could directly deactivate the motor height actuator 56 at the desired position. Alternatively, the lower limit switch 122 could provide information to the microprocessor 16 to indicate that the microprocessor 16 should control the operation of the motor height actuator 56, in a manner similar to that discussed in greater below with regard to FIGS. 12-14. When the lowered position is reached, the impeller 50 is positioned in close proximity to the bottom of the reaction vessel 32 (FIGS. 5-11 illustrate examples of bottom structures that could be employed for the reaction vessel 32). In the case of the impeller 50 and the reaction vessel 32' shown in FIGS. 5 and 6, the impeller 50 is positioned with the lower sloped blades 84 in close proximity (i.e., within about 1½ inches) to the bottom the inner shell 100.

Similarly, the control system 14 is supplemented with an upper limit switch 124 that limits the maximum separation S (shown in FIG. 1) between the motor mount 52 and the top side members 40 of the cradle section 22. The upper limit switch 124 is positioned to respond when the motor 46 is positioned at the maximum separation S to prevent inappropriate actions of the system 10 unless the height of the motor 46 and related structure is sufficient to assure that a path P (shown in FIG. 3) of the reaction vessel 32 and the reaction vessel mount 28 as the reaction vessel 32 moves between the processing position (illustrated in FIGS. 1 and 2) and the dump position (illustrated in FIG. 3) is clear of obstructions. The upper limit switch 124 can provide a safety to assure that the pivoting action between the two positions is blocked in the event that the upper limit switch 124 is not engaged by the motor mount 52. Again, the response of the control system 14 to the upper limit switch 124 could be provided by direct connection between the upper limit switch 124 and other elements, such as to deactivate the dumping actuator 58 unless closed and/or to deactivate the motor 46 when closed, or could be controlled via the microprocessor 16 which receives a status indicating signal from the upper limit switch 124.

Figure 12:
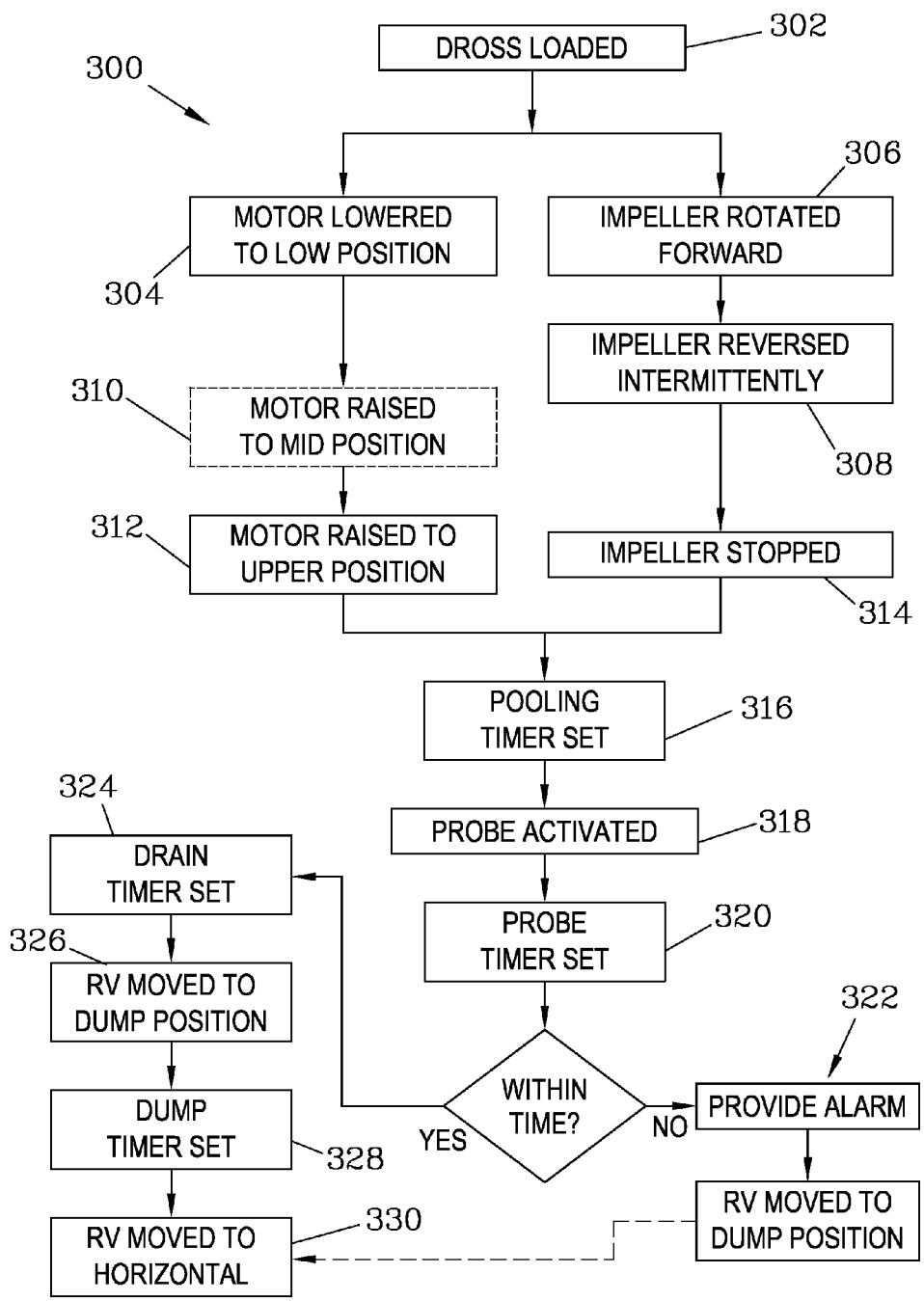
FIG. 12 is a flow diagram showing one example of a dross processing cycle which can be performed by an automated dross processing system such as is shown in FIGS. 13 and 14.
Figure 14:
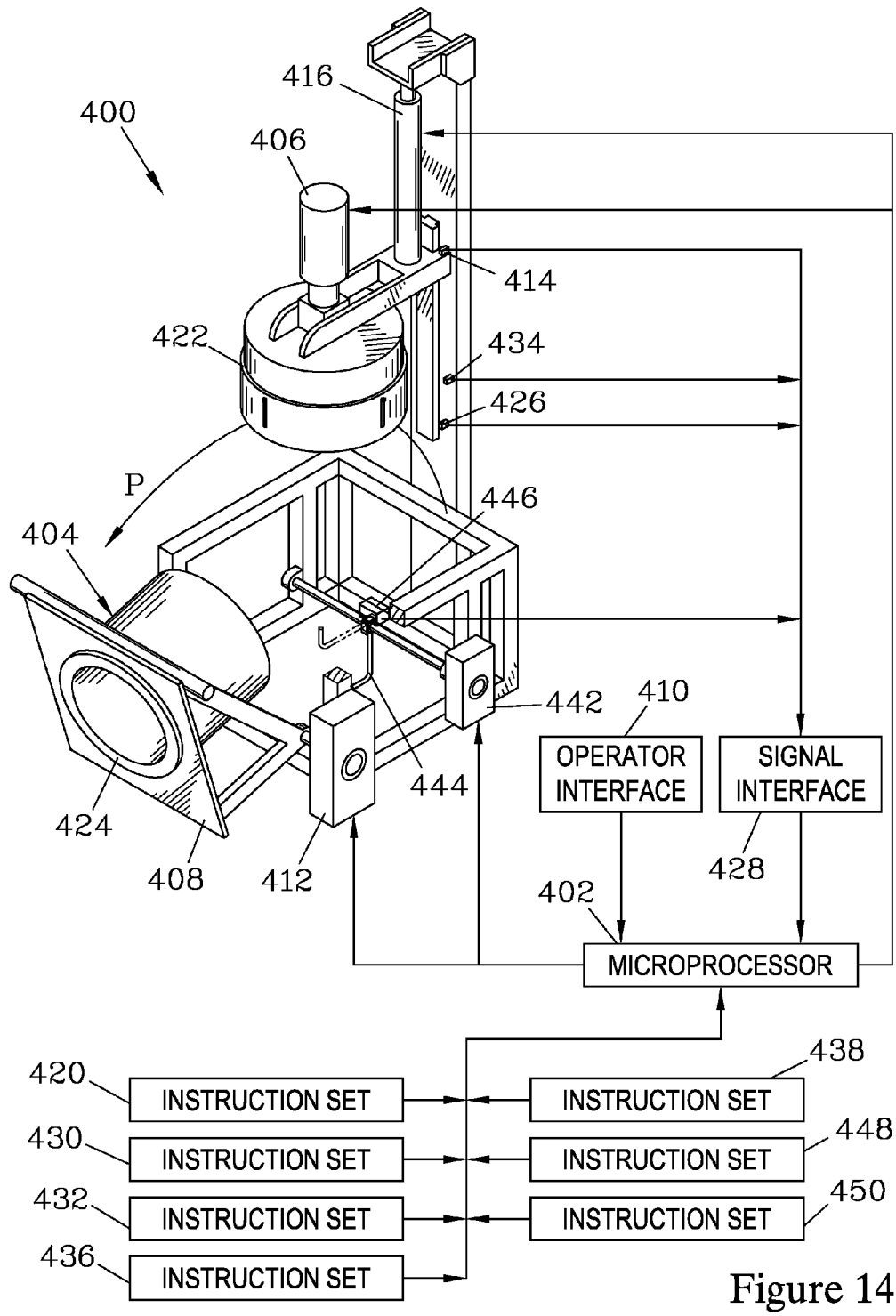
FIG. 14 is a partial isometric view that illustrates the dross processing system shown in FIG. 13 when the reaction vessel is in a dump position.

FIG. 12 shows a flow chart illustrating a representative dross processing cycle 300 for a load of dross which can be processed by a system of the present invention, such as a dross processing system 400 illustrated in FIGS. 13 and 14. The dross processing system 400 has many features in common with the dross processing system 10 shown in FIGS. 1-3 and discussed above, and is operated under the control of a microprocessor 402.

The cycle 300 begins with a reaction vessel 404 in its horizontal position, as shown in FIG. 13, where it is ready to receive the dross, and a motor 406 positioned in an upper position where it is raised to provide the operator ready access thereto (such a position is shown in FIGS. 1 and 3 for the motor 46 of the system 10) for loading of the dross. This position for the reaction vessel 404 is also a position where a reaction vessel mount 408 can be rotated to a position illustrated in FIG. 13 where the reaction vessel 404 can be dumped. The reaction vessel 404 is prepared to receive the dross by sealing a drain tube (not shown) with a plug. Additionally, the operator may apply an appropriate wash to the interior of the reaction vessel 404. In step 302 of the process, the dross is loaded into the reaction vessel 404, and if a flux is to be used, such can be added at this time. These operations to prepare for the processing cycle are typically performed manually by the operator.

Once the reaction vessel 404 has been loaded, initiation of the automated cycle can then begin by an operator providing input to the microprocessor 402 via an operator interface 410 (schematically shown in FIG. 14; an input device such as a keyboard as shown in FIG. 1 could be employed) or, if the microprocessor 402 is in a continuous run state, then the process can be started in response to sensing the dross in the reaction vessel 404; such sensing could be done by monitoring the weight of the reaction vessel 404 and/or by use of a thermal sensor to detect the heat generated by the dross; if the weight is monitored, the microprocessor 402 could be configured to adjust details of the cycle 300 according to the amount of dross to be processed. If the process cycle is to be started by the operator and not under the control of the microprocessor 402 but the microprocessor runs continuously, weight, temperature, and/or other sensors could be employed to activate a timing routine (not shown) that causes the microprocessor 402 to activate an alarm to warn the operator if the cycle has not started within a specified time after the sensor signals indicate the presence of dross loaded into the reaction vessel 404. If the operator does not respond to the alarm, the microprocessor 402 could cause activation of a dumping actuator 412 to move the reaction vessel 404 to a dump position (as shown in FIG. 14) and dump out the contents of the reaction vessel 404 to prevent damage to the reaction vessel 404.

To prevent interference with structures associated with the motor 406, it is preferred for the dumping actuator 412 to be disabled unless an upper limit switch 414 is closed as a result of the position of the motor 406. Such deactivation could be by a direct connection from the upper limit switch 414 to the dumping actuator 412; however, greater flexibility in operation can be attained when the upper limit switch 414 provides a status signal to the microprocessor 402 to indicate that the motor 406 is at its upper position to allow the microprocessor 402 to select appropriate actions when this condition is met.

As the process cycle is initiated, the microprocessor 402 directs a height actuator 416 to move a motor 406 to its lower position (as indicated in step 304 of the process 300) and also directs the motor 406 to activate so as to rotate an impeller 418 (shown in FIG. 13) in a forward direction (as indicated in step 306) such that its blades tend to dig into the dross as the impeller 418 is lowered into the reaction vessel 404. This is done by the microprocessor 402 operating according to a first instruction set 420 provided to it. This instruction set 420 determines when the initiation of the motor 406 is to begin, and the instruction to activate the motor 406 could be made responsive to the opening of the upper limit switch 414 as the motor 406 is lowered. In the flow chart of FIG. 12, the steps (304, 306) are illustrated on parallel paths, one indicating the operation of the motor 406 and the other indicating the operation of the motor height controller 416. It should be appreciated by one skilled in the art that, while the motor height actuator 416 is a linear actuator in the system 400 illustrated and the microprocessor controls the extension of the motor height actuator 416, alternative actuators could be employed, such as a motor driving a pinion gear in combination with a rack.

The downward motion of the motor 406 results in engagement between a splash shield 422 and a rim 424 of the reaction vessel 404. The splash shield 422 can be configured to telescope such that it engages the rim 424 at or before the time when the impeller 418 enters the reaction vessel 404. As the impeller 418 continues to advance into the reaction vessel 404, the splash shield 422 telescopes to allow changes in the height of the impeller 418 relative to the lower end of the splash shield 422 so as to provide a sealed volume above the reaction vessel 404 to protect against splattering of the dross out to the surroundings as the impeller 418 continues to be lowered into the reaction vessel 404. While alternative structures for providing such relative motion could be employed, the telescoping splash shield 422 illustrated offers the benefit of mechanical simplicity.

When the motor 406 has reached its lowered position, such is indicated by a lower limit switch 426 that closes to provides another signal to the microprocessor 402 via a signal interface 428. The instruction set 420 can optionally direct the microprocessor 402 to activate the height actuator 416 to raise the motor 406 and the impeller 418 to their upper position and to activate the dumping actuator 412 to dump out the contents of the reaction vessel 404 in the event that the motor 406 and the impeller 418 cannot reach their lower position within a specified time; this prevents damage caused by trying to force the impeller 418 into a hardened mass of dross. As an alternative to timing to determine whether the lower limit switch 426 has closed within a set time, such actions could be performed in response to monitoring the downward force or pressure applied by the height actuator 416 or the torque on the motor 406. It should be noted that neither of these safety systems are illustrated in the simplified process flow diagram of FIG. 12.

Once the motor 406 has reached its lowered position, as indicated by closing of the lower position limit switch 426 to provides another signal to the microprocessor 402, the operation of the microprocessor 402 changes to a second instruction set 430. This instruction set 430 causes the microprocessor 402 to implement a cycle sequence for running the motor 406 for a specified mixing time, during which time rotation of the impeller 418 is periodically reversed (as indicated by step 308). To prevent undue stress on the motor 406 or the impeller 418, the rotation can be stopped for a short interval (e.g., about 1 second) before starting rotation in the opposite direction.

After a specified mixing time as specified by the instruction set 430, the height actuator 416 can optionally be adjusted to raise the motor 406 (as indicated by step 310) to bring the motor 406 to an intermediate (mid) position (illustrated in FIG. 13) where the intermittent reversing of the impeller continues for a second specified time. This option is typically employed when the volume of dross being processed is relatively large. Raising the motor 406 to such an intermediate position raises the impeller 418 away from the molten metal already pooled in the bottom of the reaction vessel 404, and concentrates the mixing action in a region of the dross that has not been previously aggressively stirred. If such is to be done, then a third instruction set 432 is provided, which could be brought into operation as a substitute for instruction set 430 by the operator via the interface 410 or, if the weight of the reaction vessel 404 is monitored using sensor (not shown), such sensor could communicate with the microprocessor 402 via the signal interface 428 and cause the selection of the third instruction set 432. The intermediate position of the motor 406 can be indicated by an intermediate position switch 434 that signals the microprocessor 402 via the signal interface 428 to provide notice that the height actuator 416 has reached the desired degree of extension.

Once the specified time interval(s) for mixing as indicated by the instruction set (430 or 432) has elapsed, the motor 406 is raised (as indicated in step 312) to remove the impeller 418 from the reaction vessel 404 and to move the motor 406 to its upper position where the motor 406, the impeller 418, and associated structures are clear of a path P (shown in FIG. 14) through which the reaction vessel 404 and the reaction vessel mount 408 pivot. The upper limit switch 414 provides a signal to the microprocessor 402 via the signal interface 428 to indicate that the motor 406 is at the upper position, and the microprocessor 402 can then employ a fourth instruction set 436 that can direct the microprocessor 402 to deactivate the motor 406 so as to stop the rotation of the impeller 418 (as indicated in step 314). The impeller 418 can continue to rotate as it is raised out of the reaction vessel 404 to promote dross dropping therefrom. Alternatively, the last time interval of the withdrawal can be partitioned to stop rotation after the impeller 418 has been raised above the reaction vessel 404 but before the upper limit switch 414 has been engaged.

A fifth instruction set 438 instructs the microprocessor 402 so as to define a pooling time (indicated as step 316) during which much of molten metal still distributed in the dross will have an opportunity to settle to the bottom region of the reaction vessel 404. This instruction set 438 may be addressable by the user via the operator interface 410 so that the pooling time can be adjusted for the size of the dross load that is being treated. During this time, a vibrator 440 (shown in FIG. 13) can be activated, and the instruction set 438 can instruct the microprocessor 402 to control operation of the vibrator 440 to promote coalescence and pooling of the molten metal in the reaction vessel 404. After the pooling time has run, the instruction set 438 instructs the microprocessor 402 to operate a probe actuator 442 (as indicated in step 318) to advance a probe 444 (shown in FIG. 14) into the drain port of the reaction vessel 404 to remove the plug therefrom to let the pooled metal drain from the reaction vessel 404 (as discussed above with regard to FIGS. 5 and 6).

In the system 400 illustrated, there is a probe sensor 446 which detects whether the probe 444 has moved to the position where the plug will be removed. A probe timer is set when the probe is activated (as indicated in step 320), and a sixth of instruction set 448 instructs the microprocessor 402 to determine whether the signal from the probe sensor 446 is received within the specified check time period. If no signal is received, an alarm is sounded (as indicated by step 322) and the dump actuator 412 is employed to dump the dross before such freezes in the reaction vessel 404. At this point, the control of the process is turned back to the operator, who can return the reaction vessel 404 to its initial horizontal position when appropriate.

If the signal is received in the check time period, then the instruction set 448 instructs the microprocessor 402 to set a drain timer 324 to provide time for the pooled metal to drain from the reaction vessel 404. After such time, a seventh instruction set 450 instructs the microprocessor 402 to activate the dump actuator 412 to move the reaction vessel 404 to its dump position (as indicate in step 326) to allow the dross to fall therefrom and any residual to be removed by the operator.

If the alarm has not been activated, the system will still be under the control of dross processing system 400. Once the dump position is reached, the seventh instruction set 450 sets a dump time (as indicated in step 328) and thereafter instructs the microprocessor 402 to activate the dump actuator 412 so as to return the reacion vessel 404 to the horizontal position (as indicated in step 330). When the vibrator 440 is provided, the instruction set 450 could also direct the microprocessor 402 to control operation of the vibrator 440 while the reaction vessel 404 is in the dump position to facilitate removal of the spent dross from the reaction vessel 404 before it is returned to its horizontal position.

Figure 15:
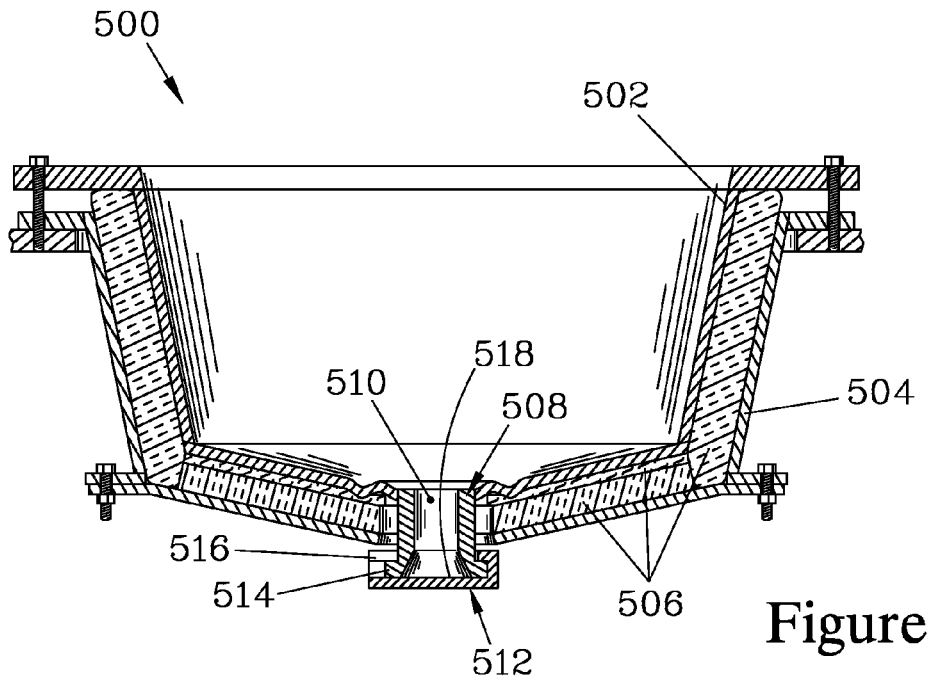
FIGS. 15 and 16 illustrate a reaction vessel that is similar to that shown in FIG. 11, but which employs a removable safety cap to securely close the drain passage.
Figure 16:
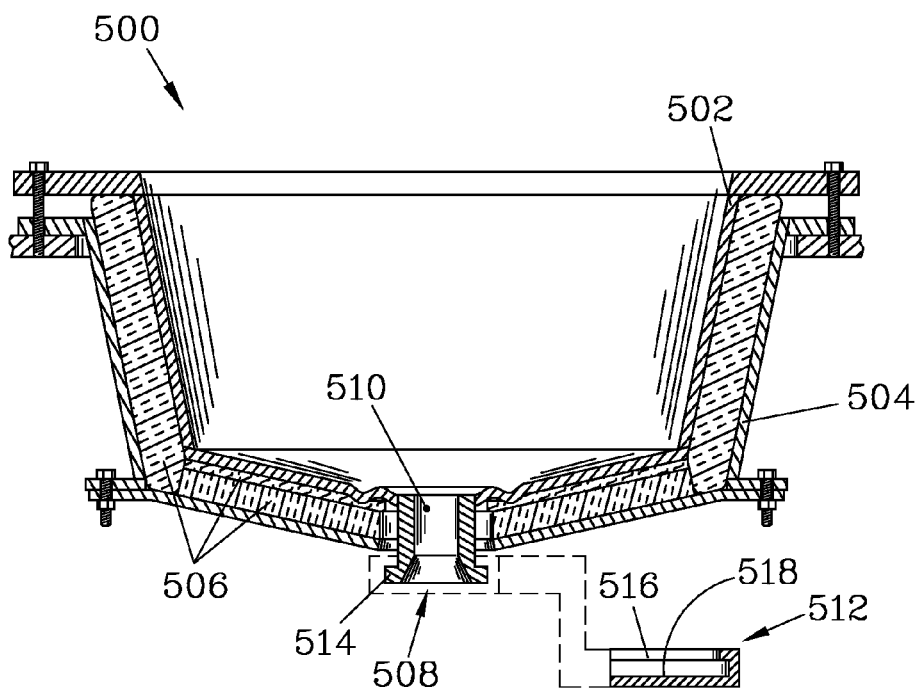

FIGS. 15 and 16 illustrate a reaction vessel 500 that shares many features in common with the reaction vessel 200 shown in FIG. 11, but which is especially well suited for use in situations where the reaction vessel 500 is used with a plug that is formed by ramming an insulating material into the drain to block it. The reaction vessel 500 has an inner shell 502 and an outer shell 504 that, when assembled together, have a space therebetween filled with insulating materials 506. A drain tube 508 extends downwardly from the inner shell 502, and provides a drain passage 510 through which collected metal can be drained from the reaction vessel 500.

To facilitate packing an insulating material into the drain passage 510 to prevent leakage of molten metal from the reaction vessel 500, a safety cap 512 is provided to securely close the drain passage 510 and allow compacting the plug; FIG. 15 shows the safety cap 512 installed on the drain tube 508, while FIG. 16 shows the safety cap 512 removed. The drain tube 508 is provided with a flange 514 that resides below and spaced apart from the outer shell 504. The safety cap 512 is provided with a cap track 516 and a planar cap surface 518, the cap track 516 being configured to slidably engage the flange 514 in such a manner that the safety cap 512 can be slid onto the drain tube 508 and, when installed, the cap surface 518 closes the drain passage 510, as shown in FIG. 15.

It should be noted that, when the reaction vessel 500 is employed in an automated dross processing system such as those discussed above, means for removing the safety cap 512 in coordination with activation of a probe to remove a plug from the drain tube 508 are needed. Such means could be provided by an independent actuator that removes the safety cap 512 prior to insertion of the probe by a probe actuator, or could be provided by a linkage that is actuated by the probe actuator and is configured to remove the safety cap 512. Alternatively, the safety cap 512 could be removed manually after the plug has been installed in the drain tube 508.

Figure 17:
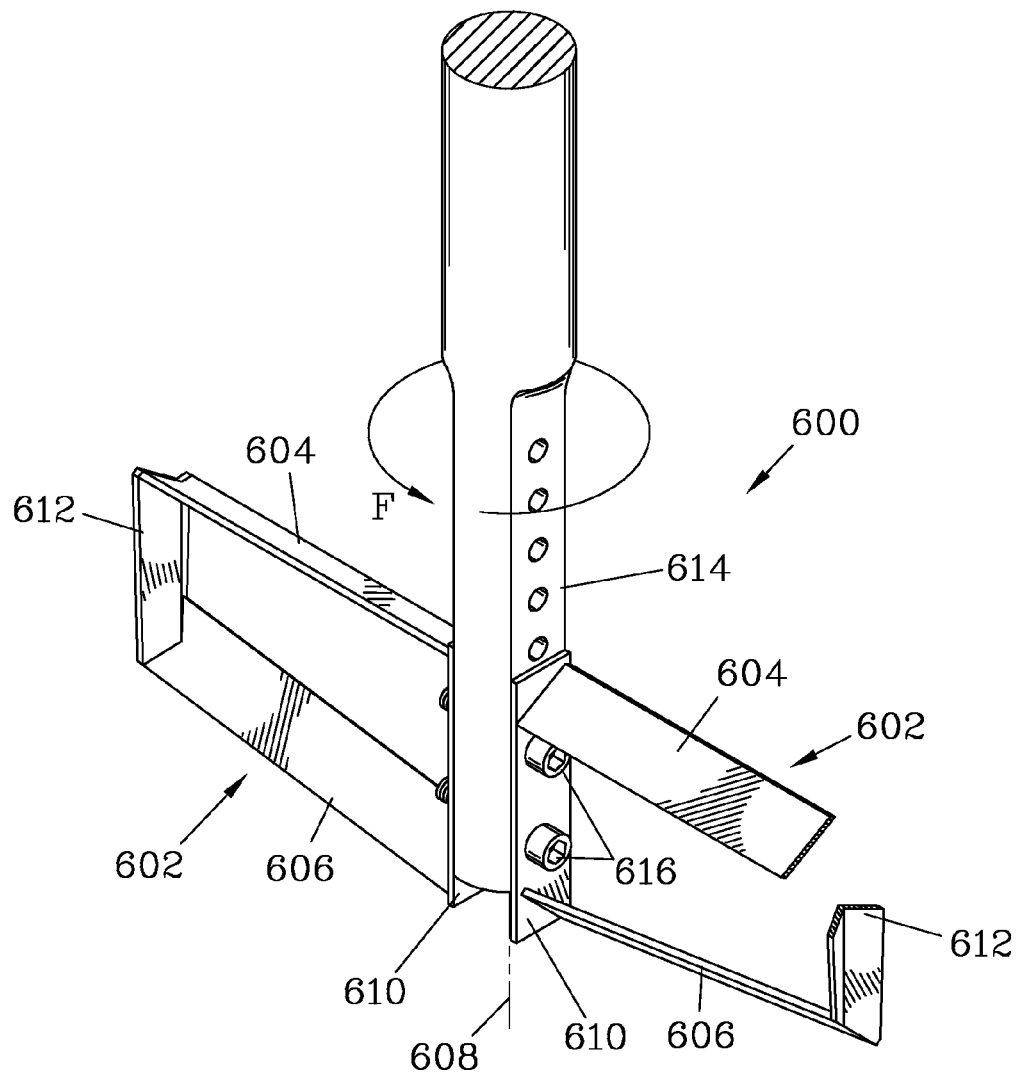
FIG. 17 illustrates an alternative impeller that can be employed in the present system. This impeller has blades that are pitched to provide an altered stifling action. Additionally, the pitch of the lower blades allows them to penetrate into the dross with an auger-like action when the impeller is rotated as it and the motor are lowered.

FIG. 17 illustrates one example of an alternative impeller 600 that can be employed in place of the impellers (50, 50') discussed above for use with certain types of dross. The impeller 600 has two paddles 602 which each have an upper blade 604 and a lower blade 606 that are inclined with respect to a motor axis 608 about which the impeller 600 rotates, rather than extending parallel thereto.

For each of the paddles 602, the lower sloped blade 606 is pitched such that, as the impeller 600 is rotated in a first direction, as indicated by the arrow F, the lower blade 606 tends to raise the dross toward the center of the paddle 602; the impeller 600 is designed to be rotated in the first direction during its immersion into the hot dross. This pitch also helps the paddles 602 to penetrate into the dross when the impeller 600 is lowered while being rotated, since the lower blades 606 tend to dig into the dross with an auger-like action to facilitate penetration into the dross.

The upper blades 604 of the impeller 600 could extend parallel to the motor axis 608 as in the impellers (50, 50') discussed above; however, as illustrated the upper blades 604 of this embodiment are inclined to the motor axis 608, having an opposite pitch to that of the lower blades 606. With this pitch, the blades (604, 606) tend to fold the dross towards the center of the paddle 602 when the impeller 600 is rotated in the first direction.

The blades (604, 606) are attached together by an inner mounting 610 and an outer support member 612. The inner mounting 610 has mounting holes to allow mounting the paddle 602 to an extension 614 by fasteners 616, allowing the paddles 602 to be readily replaced if worn or damaged. The outer support member 612 has angled surfaces which form a convex surface as viewed from the motor axis 608, and thus tend to move the dross towards the motor axis 608 when the impeller 600 is rotated in either direction to reduce wear on the sidewall of the reaction vessel.

While the novel features of the present invention have been described in terms of particular embodiments and preferred applications, it should be appreciated by one skilled in the art that substitution of materials and modification of details can be made without departing from the spirit of the invention.

What I claim is:

1. An automated dross processing system for recovering metal from a dross skimmed from a metal melt, the dross processing system comprising:
    a frame having a cradle and a substantially vertical element rising above said cradle;
    a reaction vessel mount pivotally attached to said cradle;
    a reaction vessel for holding the dross and having a bottom region with a drain port therein configured to sealably hold a plug, said reaction vessel being attached to said reaction vessel mount;
    a motor having a motor axis;
    an impeller axially aligned with the motor axis and drivable thereabout by said motor;
    a motor mount attached to said motor and configured to allow vertical motion of said motor and said impeller with respect to said substantially vertical element between at least an upper limit position and a lower limit position;
    a motor height actuator operably connected between said substantially vertical element and said motor so as to selectively raise or lower said motor and said impeller when activated;
    an upper limit switch for providing a signal when said motor and said impeller are moved to said upper limit position;
    a lower limit switch for providing a signal when said motor and said impeller are moved to said lower limit position;
    a dumping actuator attached to said frame for rotating said reaction vessel from a substantially horizontal position for treating the dross to a dump position for dumping the spent dross;
    a probe pivotally mounted with respect to said frame and configured such that it can be swung into said drain port so as to dislodge the plug therefrom;
    a probe actuator for advancing said probe into said drain port of said reaction vessel and removing the plug from said drain port to allow the molten metal to be drained from said reaction vessel;
    a microprocessor receiving signals from said limit switches;
    a timer for monitoring the time after said motor has reached the upper limit position after having been lowered to the lower limit position;
    an impeller rotation instruction set for instructing said microprocessor to activate said motor so as to define the sequence of the direction of rotation and at least one time interval for rotating said impeller;
    a motor and impeller translational instruction set for controlling operation of said motor height actuator so as to stop raising of said motor and said impeller responsive to the signal provided by said upper limit switch and to stop lowering of said motor and said impeller responsive to the signal provided by said lower limit switch;
    a probe instruction set for said microprocessor directing the microprocessor to control said probe actuator responsive to said timer; and
    a vessel dump instruction set for directing said microprocessor to instruct said cradle dumping actuator responsive to the status of said probe and said timer.

2. The dross processing system of claim 1 further comprising:
    a probe limit switch for providing a signal when said probe has been advanced so as to remove the plug from said drain port.

3. The automated dross processing system of claim 1 further comprising:
    a splash shield having a lower rim, said splash shield being movably engaged with respect to said motor so as to be positionable such that said impeller can extend below said lower rim of said splash shield; and
    further wherein said vessel dump instruction set directs said microproccesor to operate said dumping actuator responsive to said upper limit switch to assure clearance when said reaction vessel is pivoted between its two positions such that said reaction vessel and said reaction vessel mount clear said impeller and said splash shield.

4. The dross processing system of claim 1 wherein said reaction vessel further comprises:
    an inner shell having,
        an inner shell rim;
        an inner shell sidewall terminating in an inner sidewall upper edge that joins said inner shell rim and an inner sidewall lower edge,
        an inner shell bottom plate attached to said inner sidewall lower edge and having an inner bottom central passage,
            said drain port being provided by a drain tube joined to said inner bottom central passage and extending downwardly therefrom, said drain tube having a drain passage therethrough;
    an outer shell having,
        an outer shell sidewall terminating in an outer sidewall upper edge and an outer sidewall lower edge,
        an outer shell mounting structure attached to said outer sidewall upper edge and attachable to said inner shell rim,
        an outer shell bottom plate removably attaching to said outer sidewall lower edge and having an outer bottom plate central opening,
            said inner shell and said outer shell being configured with respect to each other that said sidewalls and said bottom plates are spaced apart when said outer shell mounting structure is attached to said inner shell rim; and
    rigid bottom insulation interposed between said inner shell bottom plate and said outer shell bottom plate so as to support said inner shell bottom plate with respect to said outer shell bottom plate.

5. The dross processing system of claim 4 wherein said rigid bottom insulation further comprises:
    a plurality of insulating tiles.

6. The dross processing system of claim 4 wherein said drain tube is joined to said inner bottom central passage via an accordion-like structure.

7. The dross processing system of claim 4 wherein the size of at least a terminal portion of said drain tube increases as it extends away from said inner shell bottom plate.

8. The dross processing system of claim 1 wherein said impeller further comprises:
    a shaft extending along the shaft axis;

a plurality of paddles attaching to said shaft, each of said paddles having,
an upper blade extending substantially normal to the shaft axis;
a lower blade extending at an inclination to a plane normal to the shaft axis, said lower blade being vertically spaced apart from said upper blade; and
an outer support plate which attaches to and terminates said upper and lower blades.

9. The dross processing system of claim 8 wherein said outer support plates are convex when viewed from said shaft.

10. The dross processing system of claim 9 wherein said upper blade and said lower blade of each of said paddles are pitched with respect to the motor axis and each other such that said blades act to converge the dross when rotated in a first direction and act to diverge the dross when rotated in the opposite direction.

11. The dross processing system of claim 8 wherein said paddles are attached to said shaft with a vertical offset with respect to each other.

12. The dross processing system of claim 8 wherein each of said paddles further comprises:
an inner mounting extending between and terminating said upper blade and said lower blade, said inner mounting being configured to attach to said shaft.

13. The dross processing system of claim 1 wherein said reaction vessel mount pivots with respect to said cradle about an axis spaced apart from a plane in which a rim of said reaction vessel resides so as to reside therebelow when said cradle is in its substantially horizontal position.

14. The dross processing system of claim 2 wherein said vessel dump instruction set directs said microprocessor to operate said dumping actuator responsive to said probe limit switch and said timer so as to pivot the reaction vessel to its dump position in the event that the signal from said probe limit switch does not indicate that the probe has been sufficiently advanced into said drain port to remove the plug within a specified time.

15. A reaction vessel for containing reacting dross in a dross processing system to allow separation of recovered metal from the dross, the reaction vessel comprising:
an inner shell having,
an inner shell rim;
an inner shell sidewall terminating in an inner sidewall upper edge that joins said inner shell rim and an inner sidewall lower edge,
an inner shell bottom plate attached to said inner sidewall lower edge and having an inner bottom central passage;
a drain tube joined to said inner bottom central passage and extending downwardly therefrom, said drain tube having a drain passage therethrough;
an outer shell having,
an outer shell sidewall terminating in an outer sidewall upper edge and an outer sidewall lower edge,
an outer shell mounting structure attached to said outer sidewall upper edge and attachable to said inner shell rim,
an outer shell bottom plate removably attaching to said outer sidewall lower edge and having an outer bottom plate central opening,
said inner shell and said outer shell being configured with respect to each other that said sidewalls and said bottom plates are spaced apart when said outer shell mounting structure is attached to said inner shell rim and said outer shell bottom plate is attached to said outer sidewall lower edge;
rigid bottom insulation interposed between said inner shell bottom plate and said outer shell bottom plate so as to support said inner shell bottom plate with respect to said outer shell bottom plate; and
a piece of insulating felt material interposed between said inner shell bottom plate and said rigid bottom insulation.

16. The reaction vessel of claim 15 wherein said rigid bottom insulation further comprises:
a plurality of insulating tiles.

17. A reaction vessel for containing reacting dross in a dross processing system to allow separation of recovered metal from the dross, the reaction vessel comprising:
an inner shell having,
an inner shell rim;
an inner shell sidewall terminating in an inner sidewall upper edge that joins said inner shell rim and an inner sidewall lower edge,
an inner shell bottom plate attached to said inner sidewall lower edge and having an inner bottom central passage;
a drain tube joined to said inner bottom central passage and extending downwardly therefrom, said drain tube having a drain passage therethrough,
wherein said drain tube is joined to said inner shell bottom plate via an accordion structure;
an outer shell having,
an outer shell sidewall terminating in an outer sidewall upper edge and an outer sidewall lower edge,
an outer shell mounting structure attached to said outer sidewall upper edge and attachable to said inner shell rim,
an outer shell bottom plate removably attaching to said outer sidewall lower edge and having an outer bottom plate central opening,
said inner shell and said outer shell being configured with respect to each other that said sidewalls and said bottom plates are spaced apart when said outer shell mounting structure is attached to said inner shell rim and said outer shell bottom plate is attached to said outer sidewall lower edge; and
rigid bottom insulation interposed between said inner shell bottom plate and said outer shell bottom plate so as to support said inner shell bottom plate with respect to said outer shell bottom plate.

18. A reaction vessel for containing reacting dross in a dross processing system to allow separation of recovered metal from the dross, the reaction vessel comprising:
an inner shell having,
an inner shell rim;
an inner shell sidewall terminating in an inner sidewall upper edge that joins said inner shell rim and an inner sidewall lower edge,
an inner shell bottom plate attached to said inner sidewall lower edge and having an inner bottom central passage;
a drain tube joined to said inner bottom central passage and extending downwardly therefrom, said drain tube having a drain passage therethrough wherein the size of at least a terminal portion of said drain tube increases as it extends away from said inner shell bottom plate;
an outer shell having,
an outer shell sidewall terminating in an outer sidewall upper edge and an outer sidewall lower edge,
an outer shell mounting structure attached to said outer sidewall upper edge and attachable to said inner shell rim, an outer shell bottom plate removably attaching to said outer sidewall lower edge and having an outer bottom plate central opening, said inner shell and said outer shell being configured with respect to each other that said sidewalls and said bottom plates are spaced apart when said outer shell mounting structure is attached to said inner shell rim and said outer shell bottom plate is attached to said outer sidewall lower edge; and rigid bottom insulation interposed between said inner shell bottom plate and said outer shell bottom plate so as to support said inner shell bottom plate with respect to said outer shell bottom plate.

19. An impeller for agitating reacting dross in a dross processing system so as to promote coalescence of entrapped molten metal, the impeller comprising:

a shaft extending along a shaft axis;

a plurality of paddles attaching to said shaft, each of said paddles having, an upper blade extending substantially normal to the shaft axis;

a lower blade extending at an inclination to a plane normal to the shaft axis, said lower blade being vertically spaced apart from said upper blade; and an outer support plate which attaches to and terminates said upper and lower blades.

20. The reaction vessel of claim 15 wherein said drain tube is joined to said inner shell bottom plate via an accordion structure.

* * * * *